United States Patent [19]

Borth et al.

[11] Patent Number: 4,628,529

[45] Date of Patent: Dec. 9, 1986

[54] NOISE SUPPRESSION SYSTEM

[75] Inventors: David E. Borth, Palatine; Ira A. Gerson, Hoffman Estates; Richard J. Vilmur, Palatine, all of Ill.

[73] Assignee: Motorola, Inc., Schaumburg, Ill.

[21] Appl. No.: 750,942

[22] Filed: Jul. 1, 1985

[51] Int. Cl.[4] .............................................. H04B 15/00

[52] U.S. Cl. .............................................. 381/94; 381/68.2

[58] Field of Search .............................................. 381/58, 68, 71, 94, 381/102, 107, 47; 179/107 R, 107 FD

[56] References Cited

U.S. PATENT DOCUMENTS

| | | | |
|---|---|---|---|
| 3,180,936 | 4/1965 | Schroeder | 179/1 |
| 3,803,357 | 4/1974 | Sacks | 179/1 P |
| 4,025,721 | 5/1977 | Graupe | 381/94 |
| 4,025,724 | 5/1977 | Davidson, Jr. | 381/71 |
| 4,052,568 | 10/1977 | Jankowski | 179/15 |
| 4,063,031 | 12/1977 | Grunza | 381/47 |
| 4,133,976 | 1/1979 | Atal | 381/47 |
| 4,185,168 | 1/1980 | Graupe et al. | 179/1 P |
| 4,219,695 | 8/1980 | Wilkes | 179/1 P |
| 4,239,938 | 12/1980 | Ponto | 381/104 |
| 4,283,601 | 8/1981 | Nakajima | 381/47 |
| 4,331,837 | 5/1982 | Soumagne | 179/1 P |
| 4,378,603 | 3/1983 | Eastmond | 455/79 |
| 4,396,806 | 8/1983 | Anderson | 179/107 FD |
| 4,403,118 | 9/1983 | Zollner | 179/107 FD |
| 4,410,763 | 10/1983 | Strawczynski | 364/513.5 |
| 4,433,435 | 2/1984 | David | 381/94 |
| 4,454,609 | 6/1984 | Kates | 381/68 |
| 4,461,025 | 7/1984 | Franklin | 381/56 |
| 4,490,841 | 12/1984 | Chaplin | 381/94 |
| 4,508,940 | 4/1985 | Steeger | 179/107 FD |

FOREIGN PATENT DOCUMENTS

| | | | |
|---|---|---|---|
| 58-119214 | 7/1983 | Japan | 381/71 |
| 1087816 | 10/1967 | United Kingdom . | |

OTHER PUBLICATIONS

Steven F. Boll, "Suppression of Acoustic Noise in Speech Using Spectral Subtraction," IEEE Trans. on Acoust., Speech, and Signal Processing, vol. ASSP-27, No. 2, Apr. 1979, pp. 113-120.

Peter De Souza, "A Statistical Approach to the Design of an Adaptive Self-Normalizing Silence Detector,", IEEE Trans. on Acoust., Speech, and Signal Processing, vol. ASSP-31, No. 3, Jun. 1983, pp. 678-684.

W. J. Done et al., "Estimating the Parameters of a Noisy All-Pole Process Using Pole-Zero Modeling," IEEE ICASSP'79, Apr. 1979, pp. 228-231.

George A. Hellworth et al., "Automatic Conditioning of Speech Signals," IEEE Transactions on Audio and Electroacoustics, vol. AU-16, No. 2, Jun. 1968, pp. 169-179.

Wolfgang Hess, "A Pitch Synchronous Digital Feature Extraction System for Phonemic Recognition of Speech," IEEE Trans. on Acoust. Speech and Signal Processing, vol. ASSP-24, No. 1, Feb. 1976, pp. 14-25.

Jae S. Lim et al., "Enhancement and Bandwidth Compression of Noisy Speech," Proceedings of the IEEE, vol. 67, No. 12, Dec. 1979, pp. 1586-1604.

Robert J. McAulay et al., "Speech Enhancement Using a Soft-Decision Noise Suppression Filter," IEEE Trans. Acoust. Speech, and Signal Processing, vol. ASSP-28, No. 2, Apr. 1980, pp. 137-145.

*Primary Examiner*—Gene Z. Rubinson

*Assistant Examiner*—L. C. Schroeder

*Attorney, Agent, or Firm*—Douglas A. Boehm; Donald B. Southard; Charles L. Warren

[57] ABSTRACT

An improved noise suppression system (400) is disclosed which performs speech quality enhancement upon speech-plus-noise signal available at the input (205) to generate a clean speech signal at the output (265) by spectral gain modification. The noise suppression system of the present invention includes a background noise estimator (420) which generates and stores an estimate of the background noise power spectral density based upon pre-processed speech (215), as determined by the detected minima of the post-processed speech energy level. This post-processed speech (255) may be obtained directly from the output of the noise suppression system, or may be simulated by multiplying the pre-processed speech energy (225) by the channel gain values of the modification signal (245). This technique of implementing post-processed signal to generate the background noise estimate (325) provides a more accurate measurement of the background noise energy since it is based upon much cleaner speech signal. As a result, the present invention performs acoustic noise suppression in high ambient noise backgrounds with significantly less voice quality degradation.

51 Claims, 11 Drawing Figures

NOISE SUPPRESSION SYSTEM

BACKGROUND OF THE INVENTION

1. Field of the Invention

The present invention relates generally to acoustic noise suppression systems, and, more particularly, to an improved method and means for suppressing environmental background noise from speech signals to obtain speech quality enhancement.

2. Description of the Prior Art

Acoustic noise suppression systems generally serve the purpose of improving the overall quality of the desired signal by distinguishing the signal from the ambient background noise. More specifically, in speech communications systems, it is highly desirable to improve the signal-to-noise ratio (SNR) of the voice signal to enhance the quality of speech. This speech enhancement process is particularly necessary in environments having abnormally high levels of ambient background noise, such as an aircraft, a moving vehicle, or a noisy factory.

A typical application for noise suppression is in a hearing aid. Environmental background noise is not only annoying to the hearing-impaired, but often interferes with their ability to understand speech. One method of addressing this problem may be found in U.S. Pat. No. 4,461,025, entitled "Automatic Background Noise Suppressor." According to this approach, the speech signal is enhanced by automatically suppressing the audio signal in the absence of speech, and increasing the audio system gain when speech is present. This variation of an automatic gain control (AGC) circuit examines the incoming audio waveform itself to determine if the desired speech component is present.

A second method for enhancing the intelligiblity of speech in a hearing aid application is described in U.S. Pat. No. 4,454,609. This technique emphasizes the spectral content of consonant sounds of speech to equalize the intensity of consonant sounds with that of vowel sounds. The estimated spectral shape of the input speech is used to modify the spectral shape of the actual speech signal so as to produce an enhanced output speech signal. For example, a control signal may select one of a plurality of different filters having particularized frequency responses for modifying the spectral shape of the input speech signal, thereby producing an enhanced consonant output signal.

A more sophisticated approach to a noise suppression system implementation is the spectral subtraction—or spectral gain modification—technique. Using this approach, the audio input signal spectrum is divided into individual spectral bands by a bank of bandpass filters, and particular spectral bands are attenuated according to their noise energy content. A spectral subtraction noise suppression prefilter is described in R. J. McAulay and M. L. Malpass, "Speech Enhancement Using a Soft-Decision Noise Suppression Filter," *IEEE Trans. Acoust., Speech, Signal Processing,* vol. ASSP-28, no. 2, (April 1980), pp. 137-145. This prefilter utilizes an estimate of the background noise power spectral density to generate the speech SNR, which, in turn, is used to compute a gain factor for each individual channel. The gain factor is used as a pointer for a look-up table to determine the attenuation for that particular spectral band. The channels are then attenuated and recombined to produce the noise-suppressed output waveform.

However, in specialized applications involving relatively high background noise environments, an effective noise suppression technique is being sought. For example, some cellular mobile radio telephone systems currently offer a vehicle speakerphone option providing hands-free operation for the automobile driver. The mobile hands-free microphone is typically located at a greater distance from the user, such as being mounted overhead on the visor. The more distant microphone delivers a much poorer signal-to-noise level to the land-end party due to road and wind noise within the vehicle. Although the received speech at the land end is usually intelligible, the high background noise level can be very annoying.

Although the aforementioned prior art techniques may perform sufficiently well under nominal background noise conditions, the performance of these approaches becomes severely limited when used under such high background noise conditions. Utilizing typical noise suppression systems, the noise level over most of the audio band can be reduced by 10 dB without seriously affecting the voice quality. However, when these prior art techniques are used in relatively high background noise environments requiring noise suppression levels approaching 20 dB, there is a substantial degradation in voice quality.

A need, therefore, exists for an improved acoustic noise suppression system which provides sufficient background noise attenuation in high ambient noise environments without significantly affecting the quality of the desired signal.

SUMMARY OF THE INVENTION

Accordingly, it is an object of the present invention to provide an improved method and apparatus for suppressing background noise in high background noise environments.

Another object of the present invention is to provide an improved noise suppression system for speech communication which attains the optimum compromise between noise suppression depth and voice quality degradation.

A more particular object of the present invention is to provide a noise suppression system particularly adapted for use in hands-free cellular mobile radio telephone applications.

A further object of the present invention is to provide a low-cost acoustic noise suppression system capable of being implemented in an eight-bit microcomputer.

Briefly described, the present invention is an improved noise suppression system which performs speech quality enhancement by attenuating the background noise from a noisy pre-processed input signal—the speech-plus-noise signal available at the input of the noise suppression system—to produce a noise-suppressed post-processed output signal—the speech-minus-noise signal provided at the output of the noise suppression system—by spectral gain modification. The noise suppression system of the present invention includes a means for separating the input signal into a plurality of pre-processed signals representative of selected frequency channels, and a means for modifying an operating parameter, such as the gain, of each of these pre-processed signals according to a modification signal to provide post-processed noise-suppressed output signals. The means for generating the modification signal is responsive not only to the plurality of input signals, but also to a representation of the output signal.

Accordingly, the noise suppression system of the present invention utilizes post-processed signal energy—signal energy available at the output of the noise suppression system—to generate a modification signal to control the noise suppression parameters. It is this novel technique of implementing the post-processed signal to generate the modification signal which allows the present invention to perform acoustic noise suppression in high ambient noise backgrounds with significantly less voice quality degradation.

In the preferred embodiment, the noisy pre-processed input speech signal is divided into a plurality of selected frequency channels by a bank of bandpass filters. The gain of these channels is then adjusted according to the modification signal, and the channels are then recombined to produce the clean post-processed output speech signal. The modification signal is comprised of individual channel gain values which correspond to individual channel signal-to-noise ratio estimates. These SNR estimates are based upon the current pre-processed speech energy in each channel (signal) and the current background noise energy estimate in each channel (noise). This background noise estimate is generated by storing an estimate of the background noise power spectral density based upon pre-processed speech energy, as determined by the detected minima of the post-processed speech energy level. This post-processed speech may be obtained directly from the output of the noise suppression system, or may be simulated by multiplying the pre-processed speech energy by the channel gain values of the modification signal. Consequently, the performance of the entire noise suppression system is greatly enhanced with the improvement in accuracy of the background noise estimate, since this estimate is based on a much cleaner speech signal than has been previously utilized.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DESCRIPTION OF THE PREFERRED EMBODIMENT

Figure 1:
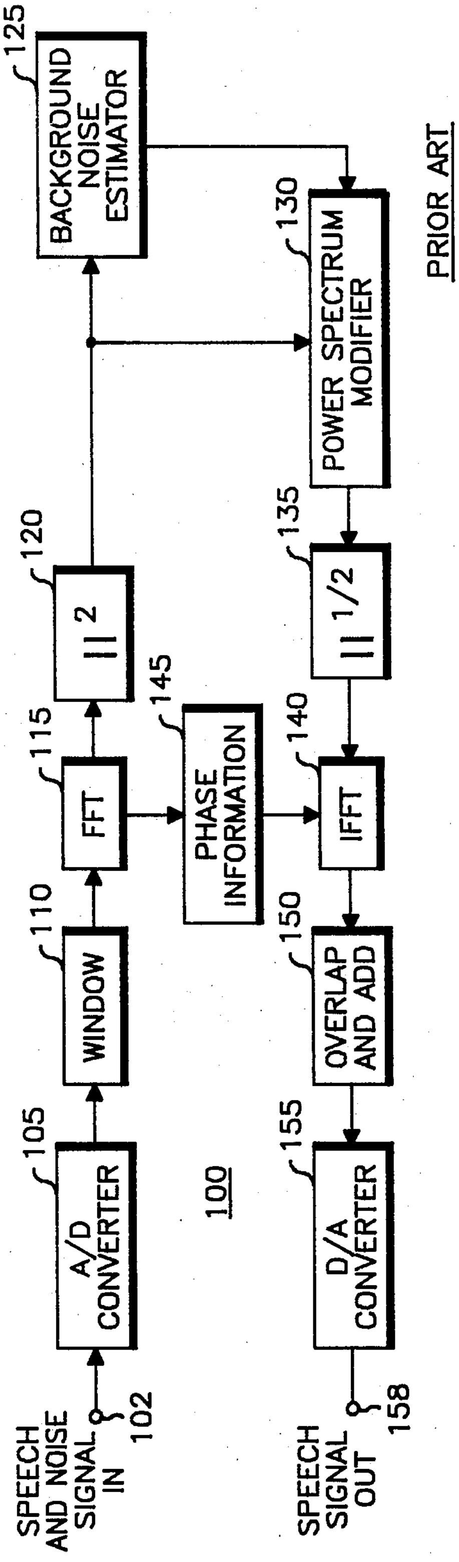
PRIOR ART Fig. 1
FIG. 1 is a block diagram of a basic noise suppression system known in the art which illustrates the spectral gain modification technique.

Referring now to the accompanying drawings, FIG. 1 illustrates the general principle of spectral subtraction noise suppression as known in the art. A continuous time signal containing speech plus noise is applied to input 102 of noise suppression system 100. This signal is then converted to digital form by analog-to-digital converter 105. The digital data is then segmented into blocks of data by the windowing operation (e.g., Hamming, Hanning, or Kaiser windowing techniques) performed by window 110. The choice of the window is similar to the choice of the filter response in an analog spectrum analysis. The noisy speech signal is then converted into the frequency domain by Fast Fourier Transform (FFT) 115. The power spectrum of the noisy speech signal is calculated by magnitude squaring operation 120, and applied to background noise estimator 125 and to power spectrum modifier 130.

The background noise estimator performs two functions: (1) it determines when the incoming speech-plus-noise signal contains only background noise; and (2) it updates the old background noise power spectral density estimate when only background noise is present. The current estimate of the background noise power spectrum is subtracted from the speech-plus-noise power spectrum by power spectrum modifier 130, which ideally leaves only the power spectrum of clean speech. The square root of the clean speech power spectrum is then calculated by magnitude square root operation 135. This magnitude of the clean speech signal is added to phase information 145 of the original signal, and converted from the frequency domain back into the time domain by Inverse Fast Fourier Transform (IFFT) 140. The discrete data segments of the clean speech signal are then applied to overlap-and-add operation 150 to reconstruct the processed signal. This digital signal is then re-converted by digital-to-analog converter 155 to an analog waveform available at output 158. Thus, an acoustic noise suppression system employing the spectral subtraction technique requires an accurate estimate of the current background noise power spectral density to perform the noise cancellation function.

One drawback of the Fourier Transform approach of FIG. 1 is that it is a digital signal processing technique requiring considerable computational power to implement the noise suppression system in the frequency domain. Another disadvantage of the FFT approach is that the output signal is delayed by the time required to accumulate the samples for the FFT calculation.

Figure 2:
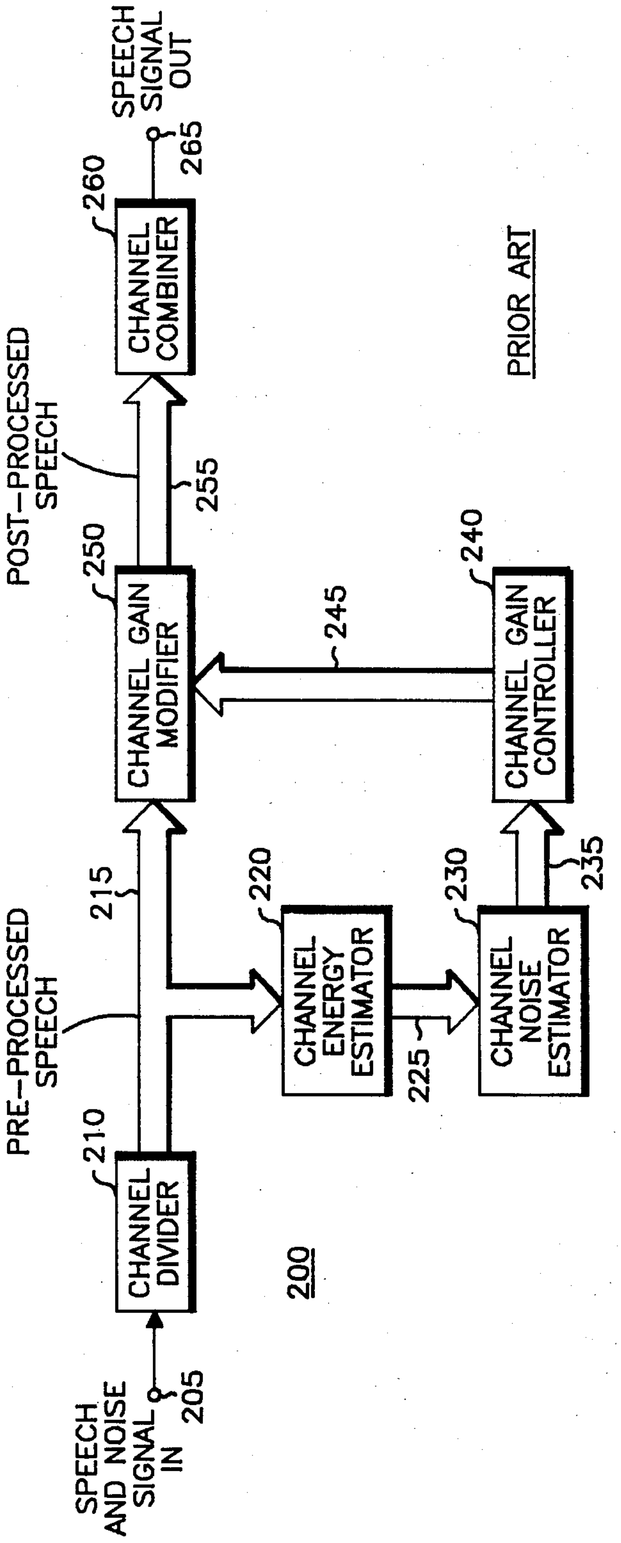
FIG. 2 is a block diagram of an alternate implementation of a prior art noise suppression system illustrating the channel filter-bank technique.

An alternate implementation of a spectral subtraction noise suppression system is the channel filter-bank technique illustrated in FIG. 2. In noise suppression system 200, the speech-plus-noise signal available at input 205 is separated into a number of selected frequency channels by channel divider 210. The gain of these individual pre-processed speech channels 215 is then adjusted by channel gain modifier 250 in response to modification signal 245 such that the gain of the channels exhibiting a low speech-to-noise ratio is reduced. The individual channels comprising post-processed speech 255 are then recombined in channel combiner 260 to form the noise-suppressed speech signal available at output 265.

Channel divider 210 is typically comprised of a number N of contiguous bandpass filters. The filters overlap at the 3 dB points such that the reconstructed output signal exhibits less than 1 dB of ripple in the entire voice frequency range. In the present embodiment, 14 Butterworth bandpass filters are used to span the frequency range 250–3400 Hz., although any number and type of filters may be used. Also, in the preferred embodiment, the filter-bank of channel divider 210 is digitally implemented. This particular implementation will subsequently be described in FIGS. 6 and 7.

Channel gain modifier 250 serves to adjust the gain of each of the individual channels containing pre-processed speech 215. This modification is performed by multiplying the amplitude of the pre-processed input signal in a particular channel by its corresponding channel gain value obtained from modification signal 245. The channel gain modification function may readily be implemented in software utilizing digital signal processing (DSP) techniques.

Similarly, the summing function of channel combiner 260 may be implemented either in software, using DSP, or in hardware utilizing a summation circuit to combine the N post-processed channels into a single post-processed output signal. Hence, the channel filter-bank technique separates the noisy input signal into individual channels, attenuates those channels having a low speech-to-noise ratio, and recombines the individual channels to form a low-noise output signal.

The individual channels comprising pre-processed speech 215 are also applied to channel energy estimator 220 which serves to generate energy envelope values $E_1$–$E_N$ for each channel. These energy values, which comprise channel energy estimate 225, are utilized by channel noise estimator 230 to provide an SNR estimate $X_1$–$X_N$ for each channel. The SNR estimates 235 are then fed to channel gain controller 240 which provides the individual channel gain values $G_1$–$G_N$ comprising modification signal 245.

Channel energy estimator 220 is comprised of a set of N energy detectors to generate an estimate of the pre-processed signal energy in each of the N channels. Each energy detector may consist of a full-wave rectifier, followed by a second-order Butterworth low-pass filter, possibly followed by another full-wave rectifier. The preferred embodiment of the invention utilizes DSP implementation techniques in software, although numerous other approaches may be used. An appropriate DSP algorithm is described in Chapter 11 of L. R. Rabiner and B. Gold, *Theory and Application of Digital Signal Processing,* (Prentice Hall, Englewood Cliffs, N.J., 1975).

Channel noise estimator 230 generates SNR estimates $X_1$–$X_N$ by comparing the individual channel energy estimates of the current input signal energy (signal) to some type of current estimate of the background noise energy (noise). This background noise estimate may be generated by performing a channel energy measurement during the pauses in human speech. Thus, a background noise estimator continuously monitors the input speech signal to locate the pauses in speech such that the background noise energy can be measured during that precise time segment. A channel SNR estimator compares this background noise estimate to the input signal energy estimate to form signal-to-noise estimates on a per-channel basis. In the present embodiment, this SNR comparison is performed as a software division of the channel energy estimates by the background noise estimates on an individual channel basis.

Channel gain controller 240 generates the individual channel gain values of the modification signal 245 in response to SNR estimates 235. One method of selecting gain values is to compare the SNR estimate with a preselected threshold, and to provide for unity gain when the SNR estimate is below the threshold, while providing an increased gain above the threshold. A second approach is to compute the gain value as a function of the SNR estimate such that the gain value corresponds to a particular mathematical relationship to the SNR (i.e., linear, logarithmic, etc.). The present embodiment uses a third approach, that of selecting the channel gain values from a channel gain table comprised of empirically determined gain values.

Essentially the gain tables provide a nonlinear mapping between the channel SNR input and the channel gain output. Each of the channel gain values are selected as a function of two variables: (a) the individual channel number; and (b) the individual SNR estimate. When voice is present in an individual channel, the channel signal-to-noise ratio estimate will be high. A large SNR estimate $X_N$ results in a channel gain value $G_N$ approaching a maximum value of unity. The amount of the gain rise is dependent upon the detected SNR—the greater the SNR, the more the individual channel gain will be raised from the base gain (all noise). If only noise is present in the individual channel, the SNR estimate will be low, and the gain for that channel will be reduced, approaching the minimum base gain value of zero. Since voice energy does not appear in all of the channels at the same time, the channels containing a low voice energy level (mostly background noise) will be suppressed (subtracted) from the voice energy spectrum. Thus, the performance of the spectral gain modification noise suppression system is highly dependent upon the accuracy of the SNR estimate which selects a particular pre-determined channel gain value. Moreover, the accuracy of the SNR estimate is directly dependent upon the precision of the background noise estimate used to calculate the SNR estimate.

As noted above, the background noise estimate may be generated by performing a measurement of the pre-processed signal energy during the pauses in human speech. Accordingly, the background noise estimator must accurately locate the pauses in speech by performing a speech/noise decision to control the time in which a background noise energy measurement is performed. Previous methods for making the speech/noise decision have heretofore been implemented by utilizing input signal energy—the signal-plus-noise energy available at the input of the noise suppression system. This practice of using the input signal places inherent limitations upon the effectiveness of any background noise estimation technique. These limitations are due to the fact that the energy characteristics of unvoiced speech sounds are very similar to the energy characteristics of background noise. In a relatively high background noise environment, the speech/noise decision process becomes very difficult and, consequently, the background noise estimate becomes highly inaccurate. This inaccuracy directly affects the performance of the noise suppression system as a whole.

If, however, the speech/noise decision of the background noise estimate were based upon output signal energy—the signal energy available at the output of the noise suppression system—then the accuracy of the speech/noise decision process would be greatly enhanced by the noise suppression system itself. In other words, by utilizing post-processed speech—the speech energy available at the output of the noise suppression system—the background noise estimator operates on a much cleaner speech signal such that a more accurate speech/noise classification can be performed. The present invention teaches this unique concept of implementing post-processed speech signal to base these speech/noise decisions upon. Accordingly, more accurate determinations of the pauses in speech are made, and better performance of the noise suppressor is achieved.

Figure 3:
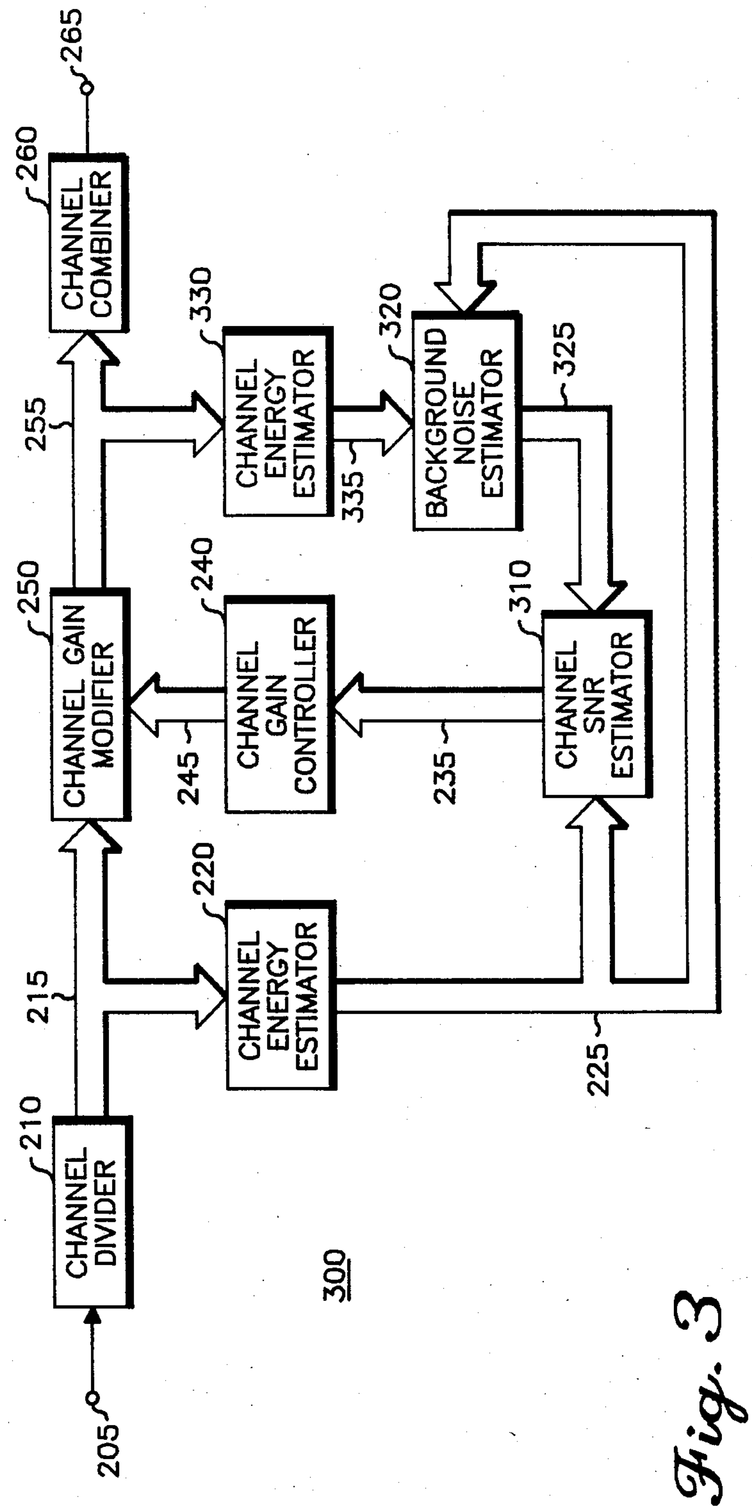
FIG. 3 is a block diagram of an improved acoustic noise suppression system employing the background noise estimation technique of the present invention.

This novel technique of the present invention is illustrated in FIG. 3, which shows a simplified block diagram of improved acoustic noise suppression system 300. Channel divider 210, channel gain modifier 250, channel combiner 260, channel gain controller 240, and channel energy estimator 220 remain unchanged from noise suppression system 200. However, channel noise estimator 230 of FIG. 2 has been replaced by channel SNR estimator 310, background noise estimator 320, and channel energy estimator 330. In combination, these three elements generate SNR estimates 235 based upon both pre-processed speech 215 and post-processed speech 255.

Operation and construction of channel energy estimator 330 is identical to that of channel energy estimator 220, with the exception that post-processed speech 255, rather than pre-processed speech 215, is applied to its input. The post-processed channel energy estimates 335 are used by background noise estimator 320 to perform the speech/noise decision.

In generating background noise estimate 325, two basic functions must be performed. First, a determination must be made as to when the incoming speech-plus-noise signal contains only background noise—during the pauses in human speech. This speech/noise decision is performed by periodically detecting the minima of post-processed speech signal 255, either on an individual channel basis or an overall combined-channel basis. Secondly, the speech/noise decision is utilized to control the time at which the background noise energy measurement is taken, thereby providing a mechanism to update the old background noise estimate. A background noise estimate is performed by generating and storing an estimate of the background noise energy of pre-processed speech 215 provided by pre-processed channel energy estimate 225. Numerous methods may be used to detect the minima of the post-processed signal energy, or to generate and store the estimate of the background noise energy based upon the pre-processed signal. The particular approach used in the present embodiment for performing these functions will be described in conjunction with FIG. 6.

Channel SNR estimator 310 compares background noise estimate 325 to channel energy estimates 225 to generate SNR estimates 235. As previously noted, this SNR comparison is performed in the present embodiment as a software division of the channel energy estimates (signal-plus-noise) by the background noise estimates (noise) on an individual channel basis. SNR estimates 235 are used to select particular gain values from a channel gain table comprised of empirically determined gains.

It is this method of more accurately controlling the time at which the background noise measurement is performed, by basing the time determination upon post-processed speech energy, that provides a more accurate measurement of the pre-processed speech for the background noise estimate. Consequently, the performance of the entire noise suppression system is improved by deriving the speech/noise decision from post-processed speech.

Figure 4:
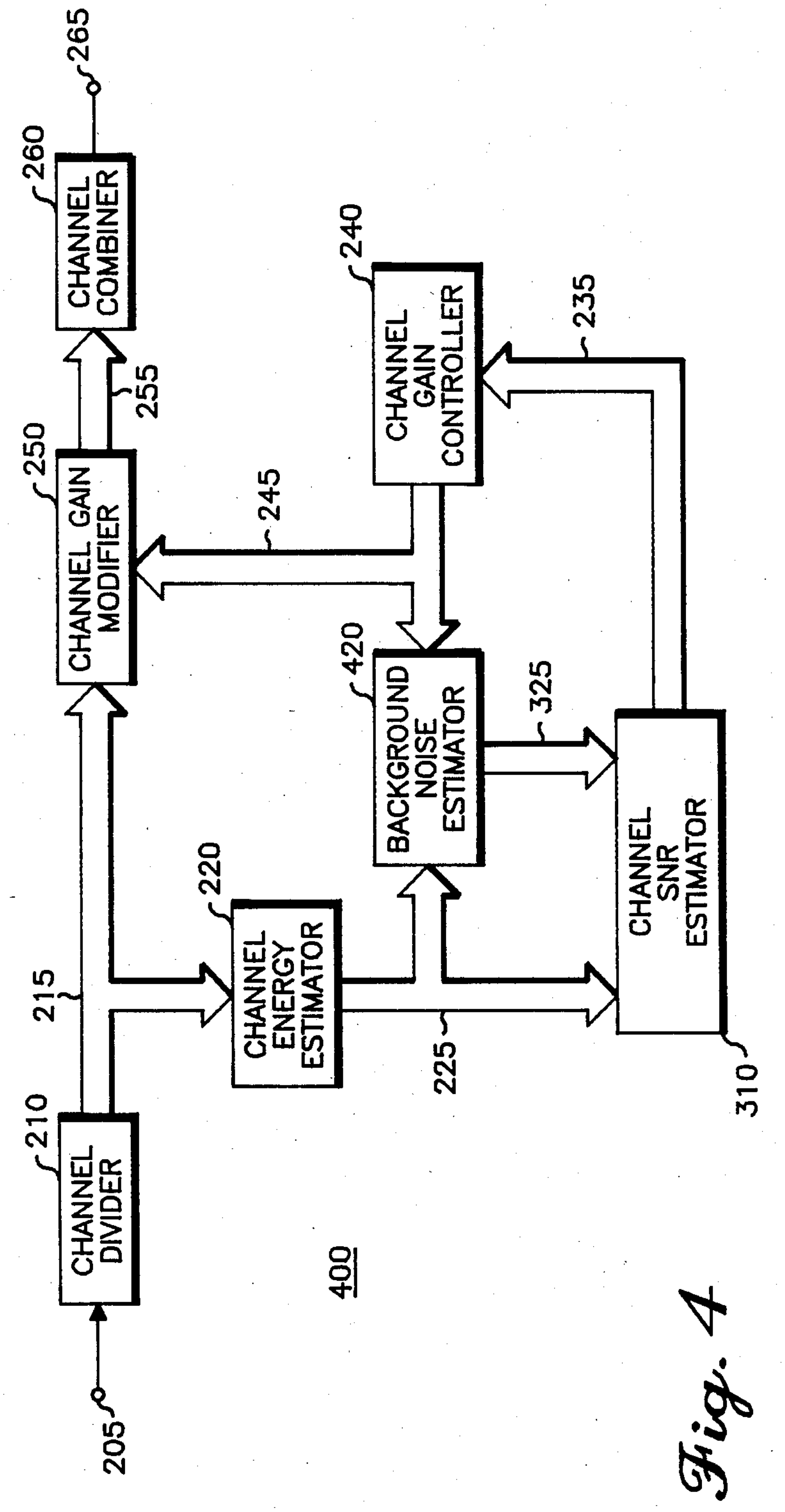
FIG. 4 is a block diagram of an alternate implementation of the present invention utilizing simulated post-processed signal energy to generate the background noise estimate.

FIG. 4 is an alternate implementation of the present invention illustrating how the post-processed speech energy, used by the background noise estimator, may be obtained in a different manner. Post-processed speech energy may be "simulated" by multiplying pre-processed channel energy estimates 225, obtained from channel energy estimator 220, by the channel gain values of modification signal 245, obtained from channel gain controller 240. This multiplication is performed on a per-channel basis in background noise estimator 420, thereby providing a plurality of background noise estimates 325 to channel SNR estimator 310. In the present embodiment, this multiplication process is performed by an energy estimate modifier incorporated in background noise estimator 420. Alternatively, this simulated post-processed speech may be provided by an external multiplication block, or by other modification means.

The advantage of providing simulated post-processed speech energy to the background noise estimator is that a second channel energy estimator (320) is no longer required. Channel energy estimator 220 provides pre-processed speech energy estimates 225 for each channel which, when multiplied by the individual channel gain factors, represent post-processed speech energy estimates 335 normally provided by post-processed channel energy estimator 330. Therefore, the function of one channel energy estimator block may be saved at the expense of some type of energy estimate modification block. Depending on the system configuration and implementation, the advantage of using simulated post-processed speech (provided by a modification block) versus post-processed speech (obtained directly from the output) may be significant.

Figure 5:
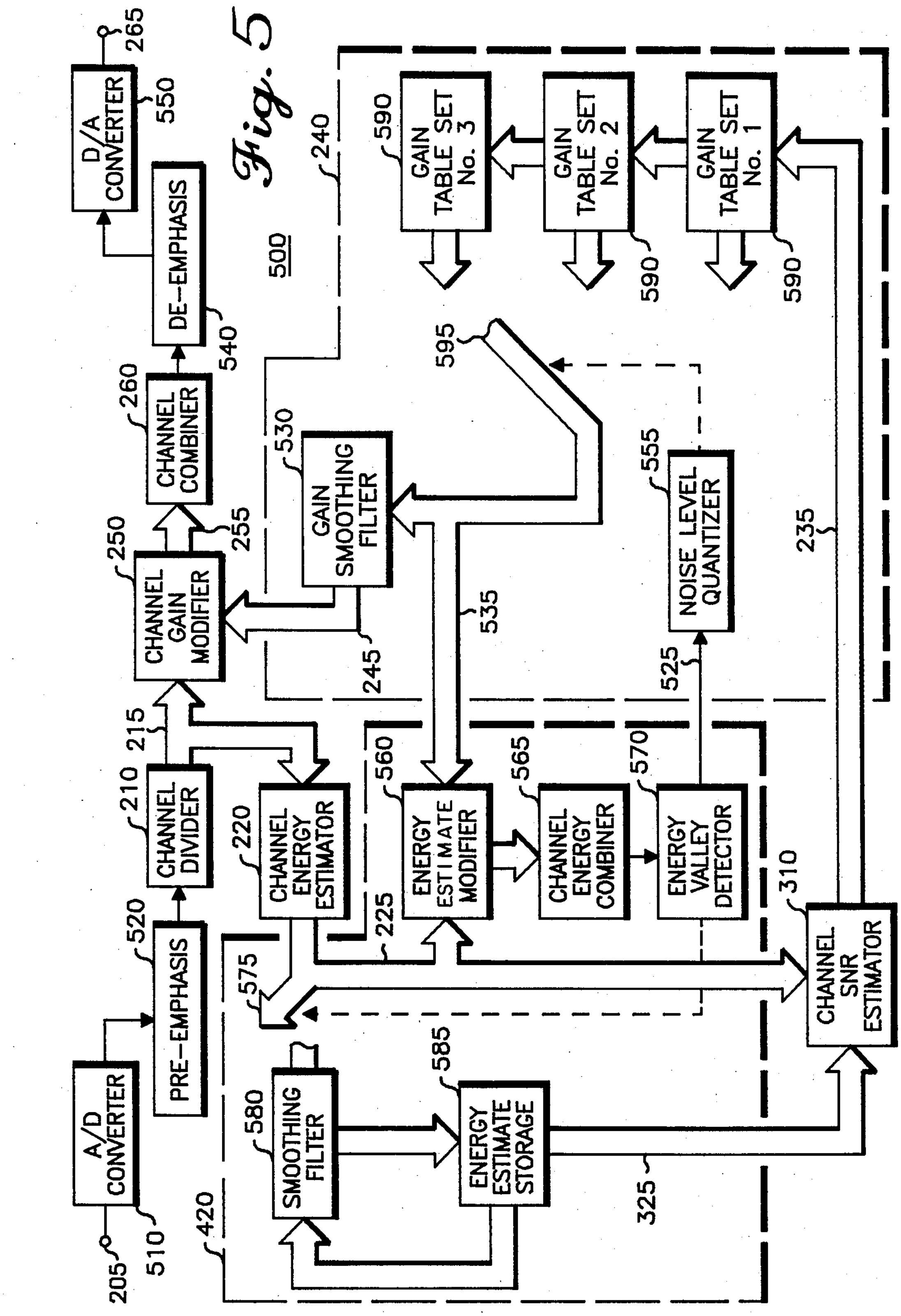
FIG. 5 is a detailed block diagram illustrating the preferred embodiment of the improved noise suppression system according to the present invention.

FIG. 5 is a detailed block diagram of the preferred embodiment of the present invention. Improved noise suppression system 500 incorporates numerous useful noise suppression techniques: (a) the channel filter-bank noise suppression technique illustrated in FIG. 2; (b) the simulated post-processed speech energy technique for background noise estimation as shown in FIG. 4; (c) the energy valley detector technique for performing the speech/noise decision; (d) a novel technique for selecting gain values from multiple gain tables according to overall background noise level; and (e) a new method of smoothing the gain factors on a per-sample basis.

Referring now to FIG. 5, analog-to-digital converter 510 samples the noisy speech signal at input 205 every 125 microseconds. This digital signal is then applied to pre-emphasis filter 520 which provides approximately 6 dB per-octave pre-emphasis to the signal before it is separated into channels. Pre-emphasis is used because both high frequency noise and high frequency voice components are normally lower in energy level as compared to low frequency noise and voice. The pre-emphasized signal is then applied to channel divider 210, which separates the input signal into N signals representative of selected frequency channels. These N channels comprising pre-processed speech 215 are then applied to channel energy estimator 220 and channel gain modifier 250, as previously described. After gain modification, the individual channels comprising post-processed speech 255 are summed by channel combiner 260 to form a single post-processed output signal. This signal is then de-emphasized at approximately 6 dB per-octave by de-emphasis network 540 before being re-converted to an analog waveform by digital-to-analog converter 550. The noise-suppressed (clean) speech signal is then available at output 265.

The energy in each of the N channels is measured by channel energy estimator 220 to produce channel energy estimates 225. These energy envelope values are applied to three distinct blocks. First, the pre-processed signal energy estimates are multiplied by raw channel gain values 535 in energy estimate modifier 560. This multiplication serves to simulate post-processed energy by performing essentially the same function as channel gain modifier 250—except on a channel energy level rather than on a channel signal level. The individual simulated post-processed channel energy estimates from energy estimate modifier 560 are applied to channel energy combiner 565 which provides a single overall energy estimate for energy valley detector 570. Channel energy combiner 565 may be omitted if multiple valley detectors are utilized on a per-channel basis and the valley detector output signals are combined.

Energy valley detector 570 utilizes the overall energy estimate from combiner 565 to detect the pauses in speech. This is accomplished in three steps. First, an initial valley level is established. If background noise estimator 420 has not previously been initialized, then an initial valley level is created which would correspond to a high background noise environment. Otherwise, the previous valley level is maintained as its post-processed background noise energy history. Next, the previous (or initialized) valley level is updated to reflect current background noise conditions. This is accomplished by comparing the previous valley level to the single overall energy estimate from combiner 565. A current valley level is formed by this updating process, which will be described in detail in FIG. 7. The third step performed by energy valley detector 570 is that of making the actual speech/noise decision. A preselected valley offset is added to the updated current valley level to produce a noise threshold level. Then the single overall post-processed energy estimate is again compared, only this time to the noise threshold level. When this energy estimate is less than the noise threshold level, energy valley detector 570 generates a speech-/noise control signal (valley detect signal) indicating that no voice is present.

The second use for pre-processed energy estimates 225 is that of updating the background noise estimate. During the pauses in the simulated post-processed speech signal, as determined by a positive valley detect signal from energy valley detector 570, channel switch 575 is closed to allow pre-processed speech energy estimates 225 to be applied to smoothing filter 580. The smoothed energy estimates at the output of smoothing filter 580 are stored in energy estimate storage register 585. Elements 580 and 585, connected as shown, form a recursive filter which provide a time-averaged value of each individual speech energy estimate. This smoothing ensures that the current background noise estimates reflect the average background noise estimates stored in storage register 585, as opposed to the instantaneous noise energy estimates available at the output of switch 575. Thus, a very accurate background noise estimate 325 is continuously available for use by the noise suppression system.

If no previous background noise estimate exists in energy estimate storage register 585, the register is preset with an initialization value representing a background noise estimate approximating that of a low noise input.

Initially, no noise suppression is being performed. As a result, energy valley detector 570 is performing speech/noise decisions on speech energy which has not yet been processed. Eventually, valley detector 570 provides rough speech/noise decisions to activate channel switch 575, which causes the initialized background noise estimate to be updated. As the background noise estimate is updated, the noise suppressor begins to process the input speech energy by suppressing the background noise. Consequently, the post-processed speech energy exhibits a slightly greater signal-to-noise ratio for the valley detector to utilize in making more accurate speech/noise classifications. After the system has been in operation for a short period of time (e.g., 100–500 milliseconds), the valley detector is operating on an improved SNR speech signal. Thus, reliable speech/noise decisions control switch 575, which, in turn, permit energy estimate storage register 585 to very accurately reflect the background noise power spectrum. It is this "bootstrapping technique"—updating the initialization values with more accurate background noise estimates—that allows the present invention to generate very accurate background noise estimates for an acoustic noise suppression system.

The third use for pre-processed channel energy estimates 225 is for application to channel SNR estimator 310. As previously noted, these estimates represent signal-plus-noise for comparison to background noise estimate 325, representing noise only. This signal-to-noise comparison is performed as a software division in channel SNR estimator 310 to produce channel SNR estimates 235. These SNR estimates are used to select particular channel gain values comprising modification signal 245.

In the present embodiment, the gain values are selected as a function of three variables by channel gain controller 240. The first variable is that of individual channel number 1 through N, such that a low frequency channel gain factor may be selected independently from that of a high frequency channel. The second variable is the individual channel SNR estimate. These two variables perform the basis of spectral gain modification noise suppression, since the individual channels containing a low signal-to-noise ratio estimate will be suppressed from the voice spectrum.

The third variable is that of overall average background noise level of the input signal. This third variable permits automatic selection of one of a plurality of gain tables, each gain table containing a set of empirically determined channel gain values which can be selected as a function of the other two variables. This gain table selection technique allows a wider choice of channel gain values, depending on the particular background noise environment. For example, a separate gain table set with different nonlinear relationships between the low frequency and high frequency gain values may be desired in a particular background noise environment, allowing the noise-suppressed speech to sound more normal. This technique is particularly useful in automobile environments, where a loss of low frequency voice components makes voices sound thin under high noise suppression.

Again referring to FIG. 5, the overall average background noise level is determined by applying the current valley level 525 from energy valley detector 570 to noise level quantizer 555. The output of quantizer 555 is used to select the appropriate gain table set for the given noise environment. Noise level quantization is required since the current valley level is a continuously varying parameter, whereas only a discrete number of gain table sets are available from which to choose gain values. Noise level quantizer 555 utilizes hysteresis to determine a particular gain table set from a range of current valley levels, as opposed to a static (strictly linear) threshold selection mechanism.

The gain table selection signal, output from noise level quantizer 555, is applied to gain table switch 595 to implement the gain table selection process. Accordingly, one of a plurality of gain table sets 590 may be chosen as a function of overall average background noise level. Each gain table set has selected individual channel gain values corresponding to various individual channel SNR estimates 235. In the present embodiment, three gain table sets are utilized, representing low, medium, or high background noise levels. However, any number of gain table sets may be used and any organization of channel gain values may be implemented.

The raw channel gain values 535, available at the output of switch 595, are applied to gain smoothing filter 530 and to energy estimate modifier 560. As noted above, these raw gain values are used by energy estimate modifier 560 to produce simulated post-processed speech energy estimates.

Gain smoothing filter 530 provides smoothing of raw gain values 535 on a per-sample basis for each individual channel. This per-sample smoothing of the noise suppression gain factors significantly improves noise flutter performance caused by step discontinuities in frame-to-frame gain changes. Different time constants for each channel are used to compensate for the different gain table sets employed. The gain smoothing filter algorithm will be described later. These smoothed gain values comprise modification signal 245 which is applied to channel gain modifier 250. As previously described, the channel gain modifier performs spectral gain modification noise suppression by reducing the relative gain of the noisy channels.

FIG. *6a/b* is a flowchart illustrating the overall operation of the present invention. The flowchart of FIG. *6a/b* corresponds to improved noise suppression system 500 of FIG. 5. This generalized flow diagram is subdivided into three functional blocks: noise suppression loop 604—further described in detail in FIG. *7a;* automatic gain selector 615—described in more detail in FIG. *7b;* and automatic background noise estimator 621—illustrated in FIGS. *7c* and *7d.*

The operation of the improved noise suppression system of the present invention begins with FIG. *6a* at initialization block 601. When the system is first powered-up, no old background noise estimate exists in energy estimate storage register 585, and no noise energy history exists in energy valley detector 570. Consequently, during initialization 601, storage register 585 is preset with an initialization value representing a background noise estimate value corresponding to a clean speech signal at the input. Similarly, energy valley detector 570 is preset with an initialization value representing a valley level corresponding to a noisy speech signal at the input.

Initialization block 601 also provides initial sample counts, channel counts, and frame counts. For the purposes of the following discussion, a sample period is defined as 125 microseconds corresponding to an 8 KHz sampling rate. The frame period is defined as being a 10 millisecond duration time interval to which the input signal samples are quantized. Thus, a frame corresponds to 80 samples at an 8 KHz sampling rate.

Initially, the sample count is set to zero. Block 602 increments the sample count by one, and a noisy speech sample is input from A/D converter 510 in block 603. The speech sample is then pre-emphasized by pre-emphasis network 520 in block 605.

Following pre-emphasis, block 606 initializes the channel count to one. Decision block 607 then tests the channel count number. If the channel count is less than the highest channel number N, the sample for that channel is bandpass filtered, and the signal energy for that channel is estimated in block 608. The result is saved for later use. Block 609 smoothes the raw channel gain for the present channel, and block 610 modifies the level of the bandpass-filtered sample utilizing the smoothed channel gain. The N channels are then combined (also in block 610) to form a single processed output speech sample. Block 611 increments the channel count by one and the procedure in blocks 607 through 611 is repeated.

If the result of the decision in 607 is true, the combined sample is de-emphasized in block 612 and output as a modified speech sample in block 613. The sample count is then tested in block 614 to see if all samples in the current frame have been processed. If samples remain, the loop consisting of blocks 602 through 613 is re-entered for another sample. If all samples in the current frame have been processed, block 614 initiates the procedure of block 615 for updating the individual channel gains.

Continuing with FIG. *6b*, block 616 initiates the channel counter to one. Block 617 tests if all channels have been processed. If this decision is negative, block 618 calculates the index to the gain table for the particular channel by forming an SNR estimate. This index is then utilized in block 619 to obtain a channel gain value from the look-up table. The gain value is then stored for use in noise suppression loop 604. Block 620 then increments the channel counter, and block 617 rechecks to see if all channel gains have been updated. If this decision is affirmative, the background noise estimate is then updated in block 621.

To update the background noise estimate, the present invention first simulates post-processed energy in block 622 by multiplying the updated raw channel gain value by the pre-processed energy estimate for that channel. Next, the simulated post-processed energy estimates are combined in block 623 to form an overall channel energy estimate for use by the valley detector. Block 624 compares the value of this overall post-processed energy estimate to the previous valley level. If the energy value exceeds the previous valley level, the previous valley level is updated in block 626 by increasing the level with a slow time constant. This occurs when voice, or a higher background noise level, is present. If the output of decision block 624 is negative (post-processed energy less than previous valley level), the previous valley level is updated in block 625 by decreasing the level with a fast time constant. This previous valley level decrease occurs when minimal background noise is present. Accordingly, the background noise history is continually updated by slowly increasing or rapidly decreasing the previous valley level towards the current post-processed energy estimate.

Subsequent to the updating of the previous valley level (block 625 or 626), decision block 627 tests if the current post-processed energy value exceeds a predetermined noise threshold. If the result of this comparison is negative, a decision that only noise is present is made, and the background noise spectral estimate is updated in block 628. This corresponds to the closing of channel switch 575. If the result of the test is affirmative, indicating that speech is present, the background noise estimate is not updated. In either case, the operation of background noise estimator 621 ends when the sample count is reset in block 629 and the frame count is incremented in block 630. Operation then proceeds to block 602 to begin noise suppression on the next frame of speech.

The flowchart of FIG. *7a* illustrates the specific details of the sequence of operation of noise suppression loop 604. For every sample of input speech, block 701 pre-emphasizes the sample by implementing the filter described by the equation:

$$Y(nT)=X(nT)-K_1[X((n-1)T)]$$

where Y(nT) is the output of the filter at time nT, T is the sample period, X(nT) and X((n−1)T) are the input samples at times nT and (n−1)T respectively, and the pre-emphasis coefficient $K_1$ is 0.9375. As previously noted, this filter pre-emphasizes the speech sample at approximately +6 dB per-octave.

Block 702 sets the channel count equal to one, and initializes the output sample total to zero. Block 703 tests to see if the channel count is equal to the total number of channels N. If this decision is negative, the noise suppression loop begins by filtering the speech sample through the bandpass filter corresponding to the present channel count. As noted earlier, the bandpass filters are digitally implemented using DSP techniques such that they function as 4-pole Butterworth bandpass filters.

The speech sample output from bandpass filter(cc) is then full-wave rectified in block 705, and low-pass filtered in block 706, to obtain the energy envelope value $E_{(cc)}$ for this particular sample. This channel energy estimate is then stored by block 707 for later use. As will be apparent to those skilled in the art, energy envelope value $E_{(cc)}$ is actually an estimate of the square root of the energy in the channel.

Block 708 obtains the raw gain value RG for channel cc and performs gain smoothing by means of a first order IIR filter, implementing the equation:

$$G(nT)=G((n-1)T)+K_2(cc)(RG(nT)-G(n-1)T)$$

where G(nT) is the smoothed channel gain at time nT, T is the sample period, G((n−1)T) is the smoothed channel gain at time (n−1)T, RG(nT) is the computed raw channel gain for the last frame period, and $K_2$(cc) is the filter coefficient for channel cc. This smoothing of the raw gain values on a per-sample basis reduces the discontinuities in gain changes, thereby significantly improving noise flutter performance.

Block 709 multiplies the filtered sample obtained in block 704 by the smoothed gain value for channel cc obtained from block 708. This operation modifies the level of the bandpass filtered sample using the current channel gain, corresponding to the operation of channel gain modifier 250. Block 710 then adds the modified filter sample for channel cc to the output sample total, which, when performed N times, combines the N modified bandpass filter outputs to form a single processed speech sample output. The operation of block 710 corresponds to channel combiner 260. Block 711 increments the channel count by one and the procedure in blocks 703 through 711 is then repeated.

If the result of the test in 703 is true, the output speech sample is de-emphasized at approximately −6 dB peroctave in block 712 according to the equation:

$$Y(nT)=X(nT)+K_3[Y((n-1)T)]$$

where X(nT) is the processed sample at time nT, T is the sample period, Y(nT) and Y((n−1)T) are the de-emphasized speech samples at times nT and (n−1)T respectively, and $K_3$ is the de-emphasis coefficient which has a value of 0.9375. The de-emphasized processed speech sample is then output to the D/A converter block 613. Thus, the noise suppression loop of FIG. *7a* illustrates both the channel filter-bank noise suppression technique and the per-sample channel gain smoothing technique.

Figure 6A:
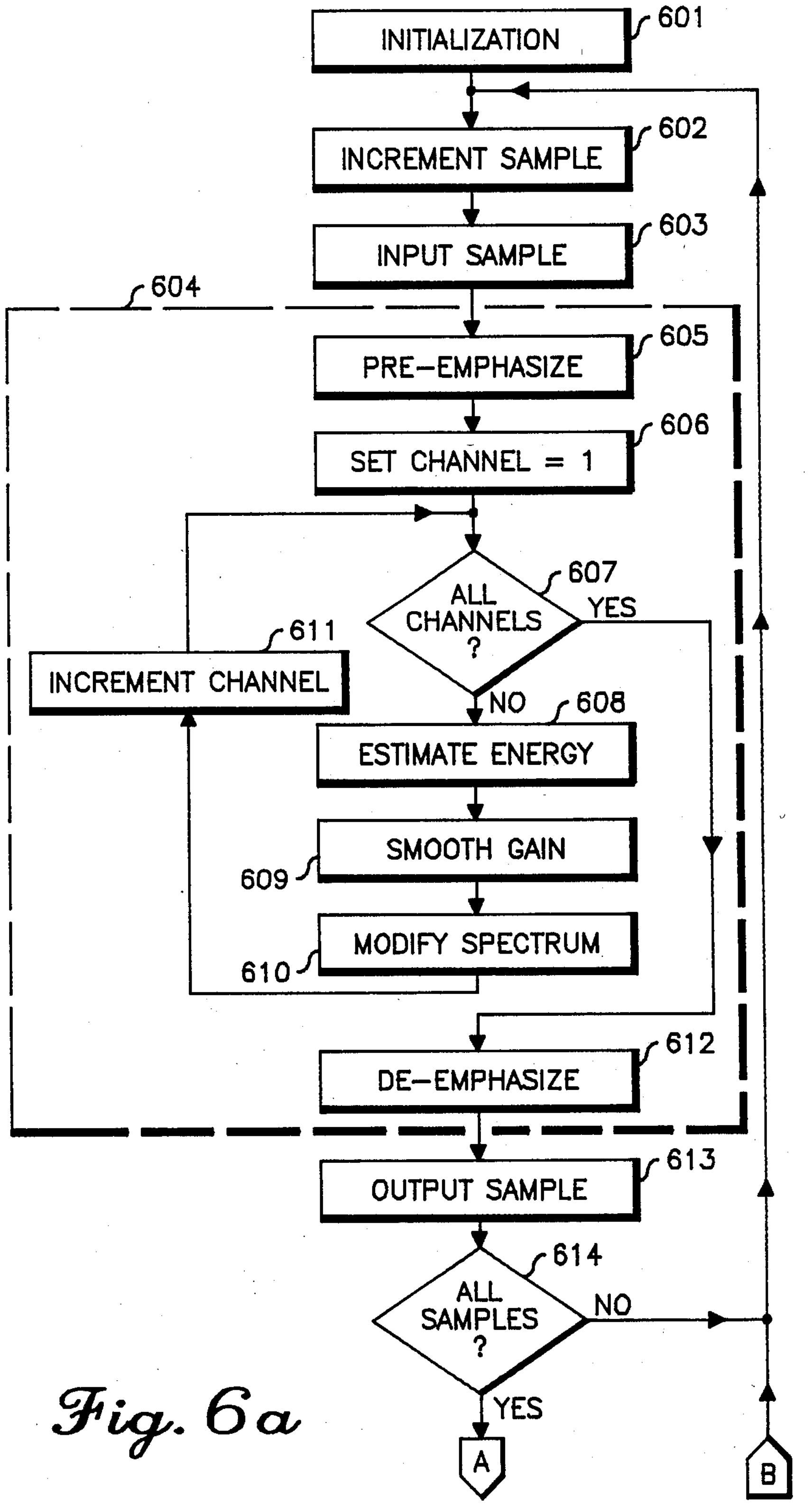
FIGS. 6*a* and *b* flowcharts illustrating the general sequence of operations performed in accordance with the practice of the present invention.
Figure 6B:
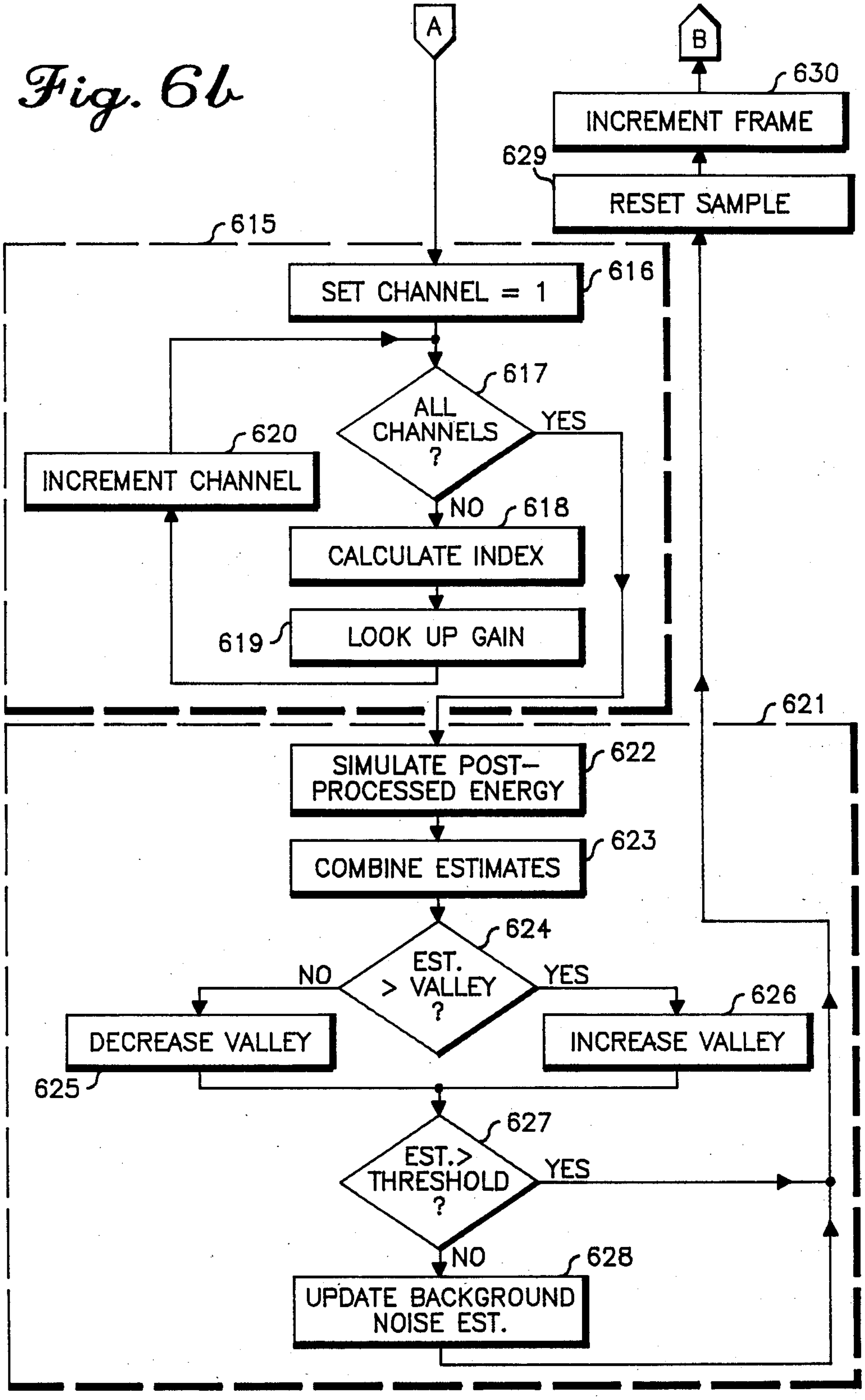

The flowchart of FIG. *7b* more rigorously describes the detailed operation of automatic gain selector block 615 of FIG. 6. Following processing of all speech samples in a particular frame, the operation is turned over to block 615 which serves to update the individual channel gains. First of all, the channel count (cc) is set to one in block 720. Next, decision block 721 tests if all channels have been processed. If not, operation proceeds with block 722 which calculates the signal-to-noise ratio for the particular channel. As previously mentioned, the SNR calculation is simply a division of the per-channel energy estimates (signal-plus-noise) by the per-channel background noise estimates (noise). Therefore, block 722 simply divides the current stored channel energy estimate from block 707 by the current background noise estimate from block 628 according to the equation:

Index (cc)=[current frame energy for channel cc]/[background noise energy estimate for channel cc].

In block 723, the particular gain table to be indexed is chosen. In the present embodiment, the quantized value of the current valley level is used to perform this selection. However, any method of gain table selection may be used. Furthermore, no gain table selection is required for noise suppression systems implementing a single gain table.

The SNR index calculated in block 722 is used in block 724 to look up the raw channel gain value from the appropriate gain table. Hence, the gain value is indexed as a function of two or three variables: (1) the channel number; (2) the current channel SNR estimate; and possibly (3) the overall average background noise level.

Block 725 stores the raw gain value chosen by block 724. The channel count is incremented in block 726, and then decision block 721 is re-entered. After all N channel gains have been updated, operation proceeds to block 621. Hence, automatic gain selector block 615 updates the channel gain values on a frame-by-frame basis to more accurately reflect the current SNR of each particular channel.

FIG. *7c* and FIG. *7d* expands upon block 621 to more specifically describe the function of automatic background noise estimator 420 of FIG. 5. Particularly, FIG. *7c* describes the process of simulating the post-processed energy and combining these estimates, while FIG. 7*d* describes the operation of valley detector 570.

Figure 7A:
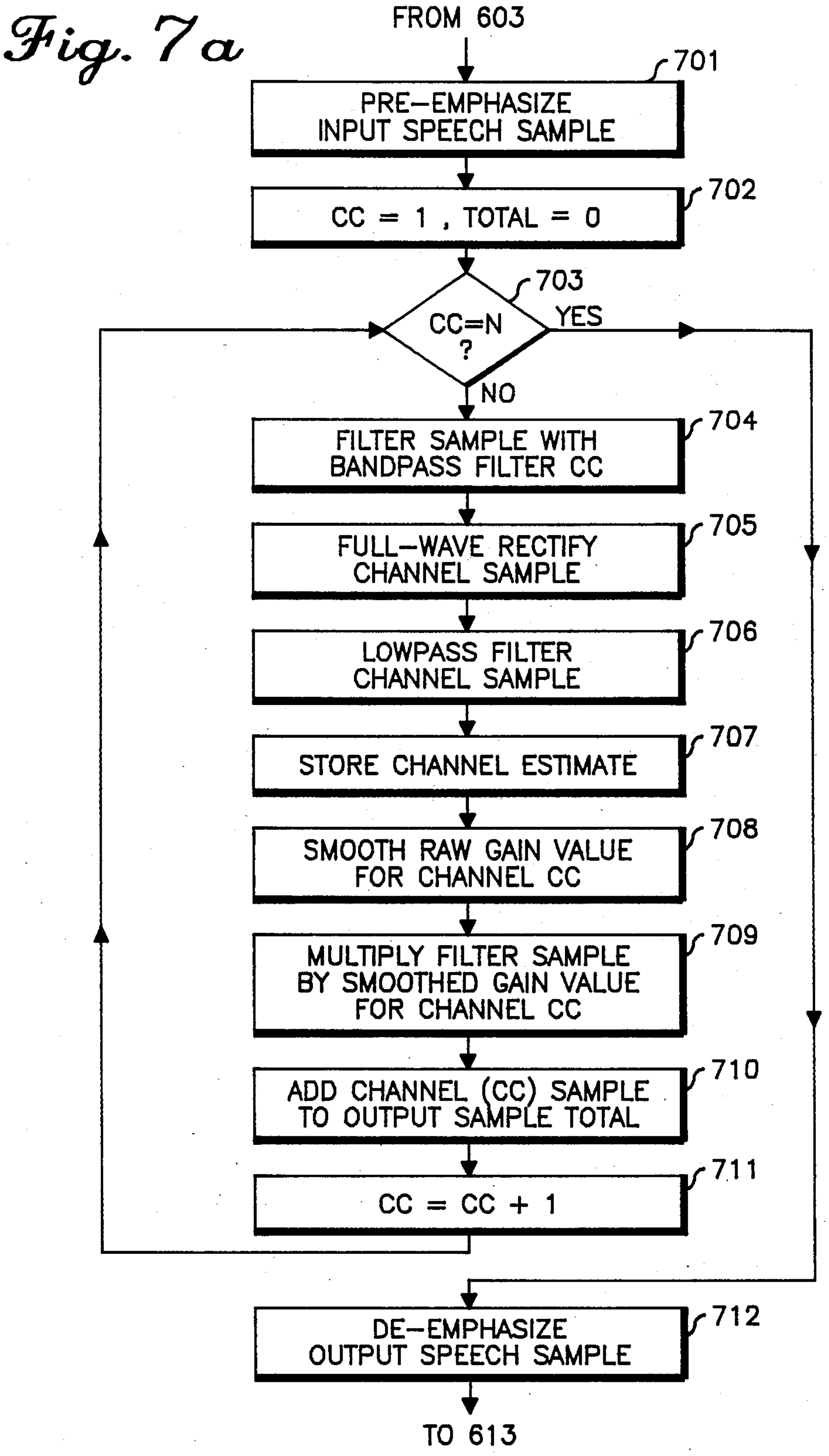
FIGS. 7*a* to *d* detailed flowcharts illustrating specific sequences of operations shown in FIG. 6.
Figure 7B:
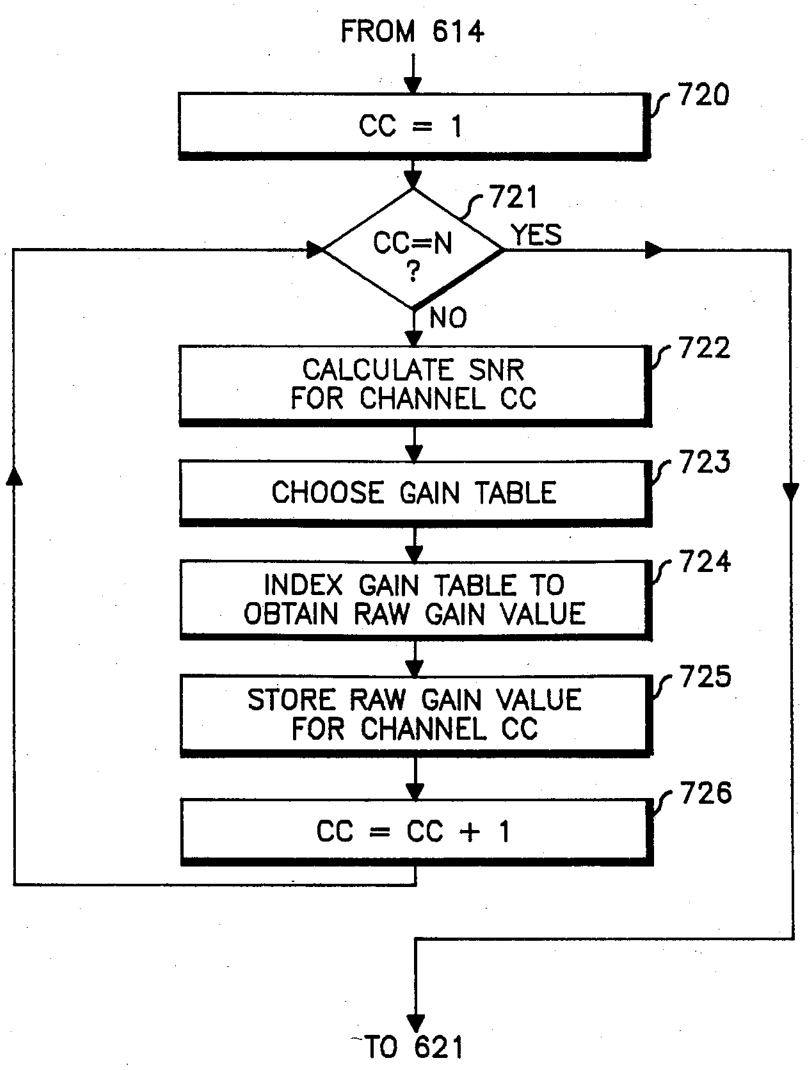
Figure 7C:
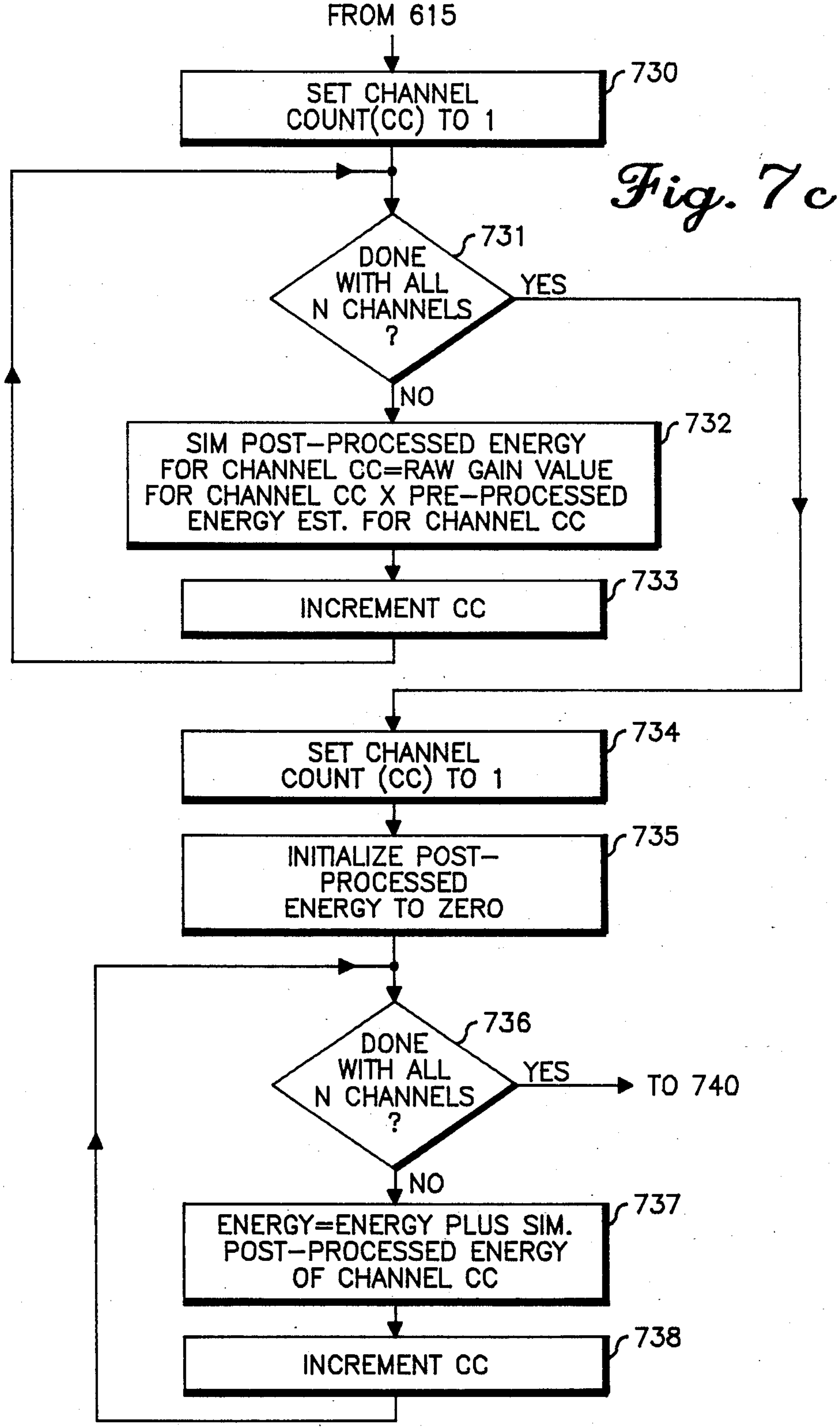

Referring now to FIG. 7*c*, the operation for simulating post-processed speech begins at block 730 by setting the channel count (cc) to one. Block 731 tests this channel count to see if all N channels have been processed. If not, the equation of block 732 describes the actual simulation process performed by energy estimate modifier 560 of FIG. 5.

Simulated post-processed speech energy is generated by multiplying the raw channel gain values (obtained directly from the channel gain tables) by the pre-processed energy estimate (obtained from channel energy estimator 220) for each channel via the equation:

$$SE(cc)=E(cc)\ RG(cc)$$

where SE(cc) is the simulated post-processed energy for channel cc, E(cc) is the current frame energy estimate for channel cc stored by block 707, and RG(cc) is the raw channel gain value for channel cc obtained from block 725. As noted earlier, E(cc) is actually the square root of the energy in the channel since it is a measure of the signal envelope. Hence, the RG(cc) term of the above equation is not squared. The multiplication performed in block 732 serves essentially the same function as channel gain modifier 250—except that the channel gain modifier utilizes pre-processed speech *signal* whereas energy estimate modifier 560 utilizes pre-processed speech energy. (See FIG. 5).

The channel counter is then incremented in block 733, and retested in block 731. When a simulated post-processed energy value is obtained for all N channels, blocks 734 through 738 serve to combine the individual simulated channel energy estimates to form the single overall energy estimate according to the equation:

$$\sum_{i=1}^{N} \text{CHANNEL}(i)\ \text{POST-PROCESSED ENERGY}$$

where N is the number of filters in the filter-bank.

Block 734 initializes the channel count to one, and block 735 initializes the overall post-processed energy value to zero. After initialization, decision block 736 tests whether or not all channel energies have been combined. If not, block 737 adds the simulated post-processed energy value for the current channel to the overall post-processed energy value. The current channel number is then incremented in block 738, and the channel number is again tested at block 736. When all N channels have been combined to form the overall simulated post-processed energy estimate, operation proceeds to block 740 of FIG. 7*d*.

Figure 7D:
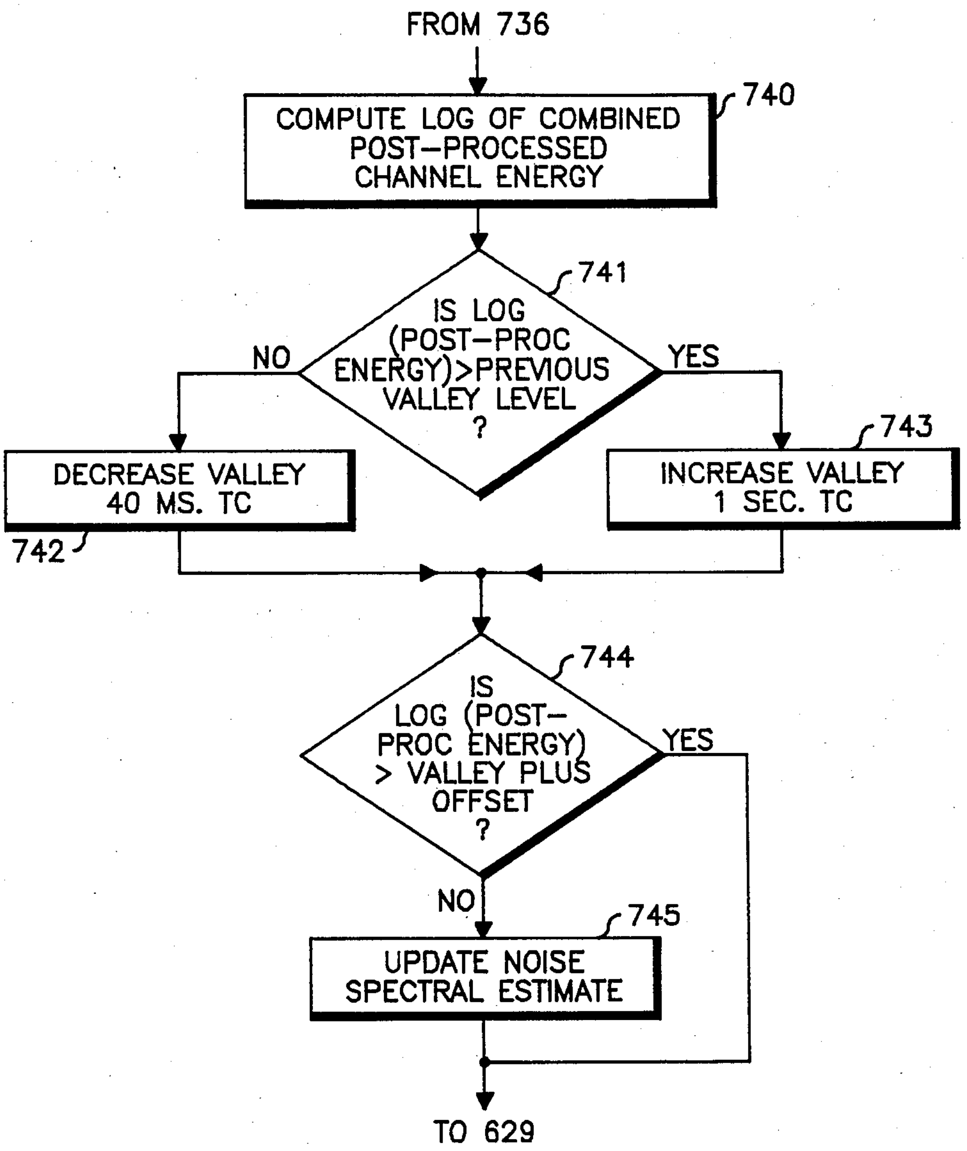

Referring now to FIG. 7*d*, blocks 740 through 745 illustrate how the post-processed signal energy is used to generate and update the previous valley level, corresponding to the operation of energy valley detector 570 of FIG. 5. After all the post-processed energies per channel have been combined, block 740 computes the logarithm of this combined post-processed channel energy. One reason that the log representation of the post-processed speech energy is used in the present embodiment is to facilitate implementation of an extremely large dynamic range (>90 dB) signal in an 8-bit microprocessor system.

Decision block 741 then tests to see if this log energy value exceeds the previous valley level. As previously mentioned, the previous valley level is either the stored valley level for the prior frame or an initialized valley level provided by block 601 of FIG. 6. If the log value exceeds the previous valley level, the previous valley level is updated in block 743 with the current log [post-processed energy] value by increasing the level with the slow time constant of approximately one second to form a current valley level. This occurs when voice or a higher background noise level is present. Conversely, if the output of decision block 741 is negative (log [post-processed energy] less than previous valley level), the previous valley level is updated in block 742 with the current log [post-processed energy] value by decreasing the level with a fast time constant of approximately 40 milliseconds to form the current valley level. This occurs when a lower background noise level is present. Accordingly, the background noise history is continuously updated by slowly increasing or rapidly decreasing the previous valley level, depending upon the background noise level of the current simulated post-processed speech energy estimate.

After updating the previous valley level, decision block 744 tests if the current log [post-processed energy] value exceeds the current valley level plus a predetermined offset. The addition of the current valley level plus this valley offset produces a noise threshold level. In the present embodiment, this offset provides approximately a 6 dB increase to the current valley level. Hence, another reason for utilizing log arithmetic is to simplify the constant 6 dB offset addition process.

If the log energy exceeds this threshold—which would correspond to a frame of speech rather than background noise—the current background noise estimate is not updated, and the background noise updating process terminates. If, however, the log energy does not exceed the noise threshold level—which would correspond to a detected minima in the post-processed signal indicating that only noise is present—the background noise spectral estimate is updated in block 745. This corresponds to the closing of channel switch 575 in response to a positive valley detect signal from energy valley detector 570. This updating process consists of providing a time-averaged value of the pre-processed channel energy estimate for the particular channel by smoothing the estimate (in smoothing filter 580), and storing these time-averaged values as per-channel noise estimates (in energy estimate storage register 585). The operation of background noise estimator block 621 ends for the particular frame being processed by proceeding to block 629 and 630 to obtain a new frame.

In summary, the present invention performs spectral subtraction noise suppression by utilizing post-processed speech signal to generate the background noise estimate. This novel technique allows the present invention to improve acoustic noise suppression performance in high ambient noise backgrounds without degrading the quality of the desired voice signal.

While specific embodiments of the present invention have been shown and described herein, further modifications and improvements may be made by those skilled in the art. All such modifications which retain the basic underlying principles disclosed and claimed herein are within the scope of this invention.

What is claimed is:

1. An improved noise suppression system for attenuating the background noise from a noisy input signal to produce a noise-suppressed output signal, said noise suppression system comprising:

means for separating the input signal into a plurality of pre-processed signals representative of selected frequency channels;

means for modifying an operating parameter of each of said plurality of pre-processed signals provided by said signal separating means to provide a plurality of post-processed signals; and means responsive to said plurality of pre-processed signals and said plurality of post-processed signals for generating a modification signal for application to said modifying means to enable the operating parameter to be modified.

2. An improved noise suppression system for attenuating the background noise from a noisy input signal to produce a noise-suppressed output signal, said noise suppression system comprising:

means for separating the input signal into a plurality of pre-processed signals representative of selected frequency channels;

means for modifying an operating parameter of each of said plurality of pre-processed signals provided by said signal separating means to provide a plurality of post-processed signals;

means for generating a control signal representative of said post-processed signals; and means responsive to said plurality of pre-processed signals and said control signal for generating a modification signal for application to said modifying means to enable the operating parameter to be modified.

3. The improved noise suppression system according to claim 2, wherein said control signal generating means provides a simulated post-processed control signal in response to said plurality of pre-processed signals and said modification signal.

4. The improved noise suppression system according to claim 3, wherein said modification signal operates on said plurality of pre-processed signals to produce said simulated post-processed control signal.

5. The improved noise suppression system according to claim 1 or 2, wherein said separating means includes a plurality of bandpass filters.

6. The improved noise suppression system according to claim 1 or 2, wherein said operating parameter of each of said plurality of pre-processed signals is the gain of said signal.

7. The improved noise suppression system according to claim 1 or 2, wherein said modification signal for application to said modifying means is comprised of a plurality of predetermined gain values.

8. The improved noise suppression system according to claim 1 or 2, further comprising means for combining said plurality of post-processed signals to produce said noise-suppressed output signal.

9. An improved noise suppression system for attenuating the background noise from a noisy input signal to produce a noise-suppressed output signal, said noise suppression system comprising:

means for separating the input signal into a plurality of pre-processed signals representative of selected frequency channels;

means for modifying the gain of each of said plurality of pre-processed signals in response to estimates of the signal-to-noise ratio (SNR) in each individual channel to provide a plurality of post-processed signals; and means for generating said SNR estimates in each individual channel based upon the current signal energy estimate of the pre-processed signal in each individual channel and the previous noise energy estimate of the pre-processed signal in each individual channel as determined by the detected minima of said plurality of post-processed signals.

10. An improved noise suppression system for attenuating the background noise from a noisy input signal to produce a noise-suppressed output signal, said noise suppression system comprising:

means for separating the input signal into a plurality of pre-processed signals representative of selected frequency channels;

means for generating an estimate of the signal-to-noise ratio (SNR) in each individual channel based upon the current signal energy estimate of the pre-processed signal in each individual channel and the previous noise energy estimate of the pre-processed signal in each individual channel as determined by the detected minima of a simulated output signal energy level, said simulated output signal being obtained by multiplying said plurality of pre-processed signals by a predetermined gain value;

means for producing said predetermined gain value in response to said SNR estimates; and means for modifying the gain of each of said plurality of pre-processed signals in response to said predetermined gain value to provide a plurality of post-processed signals.

11. The improved noise suppression system according to claim 9 or 10, wherein said separating means includes a plurality of bandpass filters covering the voice frequency range.

12. The improved noise suppression system according to claim 9 or 10, wherein said current signal energy estimates are provided by applying said plurality of pre-processed signals to energy envelope detectors.

13. The improved noise suppression system according to claim 9 or 10, wherein said previous noise energy estimates are provided by storing an estimate of the energy in each of said plurality of pre-processed signals as per-channel noise estimates.

14. The improved noise suppression system according to claim 9, wherein said detected minima is provided by periodically detecting the minimum valley level of an overall estimate of the energy of said plurality of post-processed signals, thereby generating a valley detect signal.

15. The improved noise suppression system according to claim 10, wherein said detected minima is provided by periodically detecting the minimum valley level of an overall estimate of the energy of said simulated output signal, thereby generating a valley detect signal.

16. The improved noise suppression system according to claim 9 or 10, wherein said SNR generating means includes means for dividing said current signal energy estimates by said previous noise energy estimates on a per-channel basis.

17. The improved noise suppression system according to claim 9, wherein said gain modifying means includes means for selecting a predetermined channel gain value for each of said SNR estimates on a per-channel basis.

18. The improved noise suppression system according to claim 10, wherein said gain value producing means includes means for selecting a predetermined channel gain value for each of said SNR estimates on a per-channel basis.

19. The improved noise suppression system according to claim 17 or 18, wherein said gain modifying means further includes means for multiplying the amplitude of each of said plurality of pre-processed signals by the appropriate predetermined channel gain value, thereby providing said plurality of post-processed signals.

20. The improved noise suppression system according to claim 9 or 10, further comprising:

means for combining said plurality of post-processed signals to produce said noise-suppressed output signal.

21. The improved noise suppression system according to claim 20, wherein said combining means includes means for summing said plurality of post-processed signals to form a single output signal.

22. An improved noise suppression system for attenuating the background noise from a noisy pre-processed input signal to produce a noise-suppressed post-processed output signal by spectral gain modification, said noise suppression system comprising:

signal dividing means for separating the pre-processed input signal into a plurality of selected frequency bands, thereby producing a plurality of pre-processed channels;

channel energy estimation means for generating an estimate of the energy in each of said plurality of pre-processed channels;

background noise estimation means for generating and storing estimates of the background noise energy based upon said channel energy estimates, and for periodically detecting the minima of the post-processed signal energy level obtained from the output of said noise suppression system such that said background noise estimates are updated only during said minima;

channel SNR estimation means for generating an estimate of the signal-to-noise ratio (SNR) of each individual channel based upon said channel energy estimates and said background noise estimates;

channel gain controlling means for providing channel gain values corresponding to said channel SNR estimates;

channel gain modifying means for adjusting the gain of each of said plurality of pre-processed channels provided by said signal dividing means according to said channel gain values, thereby producing a plurality of post-processed channels; and channel combination means for recombining said plurality of post-processed channels to produce said post-processed output signal.

23. An improved noise suppression system for attenuating the background noise from a noisy pre-processed input signal to produce a noise-suppressed post-processed output signal by spectral gain modification, said noise suppression system comprising:

signal dividing means for separating the pre-processed input signal into a plurality of selected frequency bands, thereby producing a plurality of pre-processed channels;

channel energy estimation means for generating an estimate of the energy in each of said plurality of pre-processed channels;

background noise estimation means for generating and storing estimates of the background noise energy based upon said channel energy estimates, and for periodically detecting the minima of a simulated post-processed signal energy level such that said background noise estimates are updated only during said minima, said simulated post-processed signal being obtained by multiplying said plurality of pre-processed channels by predetermined channel gain values;

channel SNR estimation means for generating an estimate of the signal-to-noise ratio (SNR) of each individual channel based upon said channel energy estimates and said background noise estimates;

channel gain controlling means for providing said channel gain values corresponding to said channel SNR estimates;

channel gain modifying means for adjusting the gain of each of said plurality of pre-processed channels provided by said signal dividing means according to said channel gain values, thereby producing a plurality of post-processed channels; and channel combination means for recombining said plurality of post-processed channels to produce said post-processed output signal.

24. The improved noise suppression system according to claim 22 or 23, wherein said signal dividing means includes a plurality of bandpass filters covering the voice frequency range.

25. The improved noise suppression system according to claim 24, wherein said plurality of bandpass filters is further comprised of a bank of approximately 14 contiguous bandpass filters covering the frequency range from approximately 250 Hz. to 3400 Hz.

26. The improved noise suppression system according to claim 22 or 23, wherein said channel energy estimation means includes a plurality of full-wave rectifiers coupled to low-pass filters.

27. The improved noise suppression system according to claim 22, wherein said background noise estimation means includes:

storage means for storing an estimate of the background noise energy of the pre-processed signal in each of said plurality of selected frequency bands as per-channel noise estimates, and for continuously providing said per-channel noise estimates to said channel SNR estimation means;

valley detection means for periodically detecting the minima of an overall estimate of the energy of said post-processed signal in each of a plurality of selected frequency bands, thereby generating a valley detect signal; and signal controlling means coupled to said storage means and controlled by said valley detect signal for providing new background noise estimates to said storage means only during said minima.

28. The improved noise suppression system according to claim 23, wherein said background noise estimation means includes:

storage means for storing an estimate of the background noise energy of the pre-processed signal in each of said plurality of selected frequency bands as per-channel noise estimates, and for continuously providing said per-channel noise estimates to said channel SNR estimation means;

valley detection means for periodically detecting the minima of an overall estimate of the energy of said simulated post-processed signal in each of a plurality of selected frequency bands, thereby generating a valley detect signal; and signal controlling means coupled to said storage means and controlled by said valley detect signal for providing new background noise estimates to said storage means only during said minima.

29. The improved noise suppression system according to claim 27 or 28, wherein said storage means includes:

smoothing means for providing a time-averaged value of each of said background noise energy estimates; and memory means for storing each of said time-averaged values as per-channel noise estimates.

30. The improved noise suppression system according to claim 27 or 28, wherein said valley detection means includes:

means for storing the numerical value of the previous detected minima as a previous valley level;

means for comparing the present numerical value of the overall energy estimate to said previous valley level:

means for increasing said previous valley level at a slow rate when said present numerical value is greater than said previous valley level; and means for decreasing said previous valley level at a rapid rate when said present numerical value is less than said previous valley level, thereby updating said previous valley level to provide a current valley level.

31. The improved noise suppression system according to claim 30, wherein said valley detection means further includes:

means for adding a selected valley offset to said current valley level, thereby providing a noise threshold level; and means for comparing said present numerical value to said noise threshold level, thereby generating a positive valley detect signal only when said present numerical value is less than said noise threshold level.

32. The background noise estimator according to claim 31, wherein said present numerical value and said previous valley level are expressed in logarithmic terms.

33. The improved noise suppression system according to claim 22 or 23, wherein said channel SNR estimation means includes means for dividing said channel energy estimates by said background noise estimates on a per-channel basis.

34. The improved noise suppression system according to claim 22 or 23, wherein said channel gain controlling means includes means for selecting a predetermined channel gain value for each of said SNR estimates.

35. The improved noise suppression system according to claim 34, wherein each of said predetermined channel gain values are selected as a function of (a) the channel number, and (b) the SNR estimate.

36. The improved noise suppression system according to claim 34, wherein said predetermined gain values exhibit a range from 0 to 1.

37. The improved noise suppression system according to claim 22 or 23, wherein said channel gain modifying means includes means for multiplying the amplitude of the signal in a particular pre-processed channel by said predetermined gain value for that particular channel, thereby producing a plurality of post-processed signals.

38. The improved noise suppression system according to claim 37, wherein said channel modification means includes means for summing said plurality of post-processed signals to produce a single post-processed output signal.

39. The improved noise suppression system according to claim 23, further comprising energy estimate modifier means for providing simulated post-processed signal energy to said background noise estimation means by multiplying the pre-processed signal energy obtained from said channel energy estimation means by said channel gain values provided by said channel gain controlling means.

40. The method of attenuating the background noise from a noisy input signal to produce a noise-suppressed output signal in a noise suppression system comprising the steps of:

separating the input signal into a plurality of pre-processed signals representative of selected frequency channels;

modifying an operating parameter of each of said plurality of pre-processed signals to provide a plurality of post-processed signals; and generating a modification signal responsive to said plurality of pre-processed signals and said plurality of post-processed signals, whereby said modification signal enables the operating parameter of each of said plurality of pre-processed signals to be modified.

41. The method of attenuating the background noise from a noisy input signal to produce a noise-suppressed output signal in a noise suppression system comprising the steps of:

separating the input signal into a plurality of pre-processed signals representative of selected frequency channels;

modifying an operating parameter of each of said plurality of pre-processed signals to provide a plurality of post-processed signals;

generating a control signal representative of said post-processed signals; and generating a modification signal responsive to said plurality of pre-processed signals and said control signal, whereby said modification signal enables the operating parameter of each of said plurality of pre-processed signals to be modified.

42. The method according to claim 41, further comprising the step of;

multiplying said plurality of pre-processed signals by said modification signal to produce said control signal.

43. The method according to claim 40 or 41, wherein said operating parameter of each of said plurality of pre-processed signals is the gain of said signal.

44. The method according to claim 40 or 41, further comprising the step of;

combining said plurality of post-processed signals to produce said noise-suppressed output signal.

45. The method of attenuating the background noise from a noisy input signal to produce a noise-suppressed output signal by spectral gain modification, comprising the steps of:

separating the input signal into a plurality of pre-processed signals representative of selected frequency channels;

modifying the gain of each of said plurality of pre-processed signals in response to estimates of the signal-to-noise ratio (SNR) in each individual channel to provide a plurality of post-processed signals; and generating said SNR estimates in each individual channel based upon the current signal energy estimate of the pre-processed signal in each individual channel and the previous noise energy estimate of the pre-processed signal in each individual channel as determined by the detected minima of said plurality of post-processed signals.

46. The method of attenuating the background noise from a noisy input signal to produce a noise-suppressed output signal by spectral gain modification, comprising the steps of:

separating the input signal into a plurality of pre-processed signals representative of selected frequency channels;

generating an estimate of the signal-to-noise ratio (SNR) in each individual channel based upon the current signal energy estimate of the pre-processed signal in each individual channel and the previous noise energy estimate of the pre-processed signal in each individual channel as determined by the detected minima of a simulated output signal energy level, said simulated output signal being obtained by multiplying said plurality of pre-processed signals by a predetermined gain value;

producing said predetermined gain value in response to said SNR estimates; and the gain of each of said plurality of modifying the gain of each of said plurality of pre-processed signals in response to said predetermined gain value to provide a plurality of post-processed signals.

47. The method according to claim 45, wherein said detected minima is provided by periodically detecting the minimum valley level of an overall estimate of the energy of said plurality of post-processed signals, thereby generating a valley detect signal.

48. The method according to claim 46, wherein said detected minima is provided by periodically detecting the minimum valley level of an overall estimate of the energy of said simulated output signal, thereby generating a valley detect signal.

49. The method according to claim 45 or 46, wherein said current signal energy estimates are provided by applying said plurality of pre-processed signals to energy envelope detectors.

50. The method according to claim 45 or 46, wherein said previous noise energy estimates are provided by storing an estimate of the noise energy in each of said plurality of pre-processed signals only during the presence of said valley detect signal.

51. The method according to claim 45 or 46, further comprising the step of;

combining said plurality of post-processed signals to produce said noise-suppressed output signal.

* * * * *

UNITED STATES PATENT AND TRADEMARK OFFICE

CERTIFICATE OF CORRECTION

PATENT NO. : 4,628,529

DATED : December 9, 1986

INVENTOR(S) : Borth et al.

It is certified that error appears in the above-identified patent and that said Letters Patent is hereby corrected as shown below:

In the claims:

Claim 46, Column 23, Line 28:

Delete: "the gain of each of said plurality of"

Signed and Sealed this

Twenty-first Day of April, 1987

*Attest:*

DONALD J. QUIGG

*Attesting Officer* *Commissioner of Patents and Trademarks*